(12) United States Patent
Ganapathy et al.

(10) Patent No.: US 11,907,356 B2
(45) Date of Patent: Feb. 20, 2024

(54) SYSTEM, METHOD, AND COMPUTER-READABLE RECORDING MEDIUM OF CREATING, ACCESSING, AND RECOVERING A USER ACCOUNT WITH SINGLE SIGN ON PASSWORD HIDDEN AUTHENTICATION

(71) Applicant: ARRIS Enterprises LLC, Suwanee, GA (US)

(72) Inventors: Jalagandeswari Ganapathy, Bangalore (IN); Muralidharan Narayanan, Bangalore (IN); David Brumbaugh, Collegeville, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 384 days.

(21) Appl. No.: 17/143,396

(22) Filed: Jan. 7, 2021

(65) Prior Publication Data

US 2021/0216620 A1  Jul. 15, 2021

Related U.S. Application Data

(60) Provisional application No. 62/958,971, filed on Jan. 9, 2020.

(51) Int. Cl.
*G06F 21/41* (2013.01)
*G06F 21/45* (2013.01)
(Continued)

(52) U.S. Cl.
CPC ............ *G06F 21/45* (2013.01); *H04L 9/0894* (2013.01); *H04L 9/3228* (2013.01);
(Continued)

(58) Field of Classification Search
CPC .. G06F 21/45; G06F 2221/2131; G06F 21/41; H04L 9/0894; H04L 9/3228;
(Continued)

(56) References Cited

U.S. PATENT DOCUMENTS

2003/0182584 A1* 9/2003 Banes ..................... G06F 21/34
                                                                    713/182
2008/0059804 A1* 3/2008 Shah ..................... H04L 63/083
                                                                    726/8
(Continued)

*Primary Examiner* — Joseph P Hirl
*Assistant Examiner* — Aayush Aryal
(74) *Attorney, Agent, or Firm* — Wenderoth, Lind & Ponack, L.L.P.

(57) ABSTRACT

A system, method, and computer-readable recording media for a user account secure with a single sign on (SSO) password hidden authentication. Receiving credential information (CI) and generating the SSO password through at least one client device (CD). Encrypting the SSO password. Storing the SSO password in the CD and an electronic device (ED). Transmit the SSO password and encrypted SSO password to a cloud services platform (CSP), where the CSP stores both. Storing the SSO password in a cloud server (CS). Accessing the user account, if SSO password is unavailable, through the CSP transmitting a one time passcode to a user email, the CD setting a temporary password transferred to the CSP. The CSP confirming a match and (Continued)

transmitting the encrypted SSO password to the CD, the CD decrypting the encrypted SSO password and resetting the temporary password to the SSO password.

16 Claims, 10 Drawing Sheets

(51) Int. Cl.
*H04L 9/08* (2006.01)
*H04L 9/40* (2022.01)
*H04L 9/32* (2006.01)

(52) U.S. Cl.
CPC ...... *H04L 63/0815* (2013.01); *H04L 63/0838* (2013.01); *G06F 2221/2131* (2013.01)

(58) Field of Classification Search
CPC ............. H04L 63/0815; H04L 63/0838; H04L 2463/061; H04L 2463/062
See application file for complete search history.

(56) References Cited

U.S. PATENT DOCUMENTS

| | | | |
|---|---|---|---|
| 2011/0016515 A1* | 1/2011 | Dhanakshirur | G06F 21/42 726/6 |
| 2013/0269018 A1* | 10/2013 | Dingwall | G06F 21/34 726/8 |
| 2015/0319142 A1* | 11/2015 | Herberg | H04L 9/3228 713/171 |
| 2016/0014110 A1* | 1/2016 | Kurspahic | H04L 63/083 713/183 |
| 2016/0094543 A1* | 3/2016 | Innes | H04L 63/061 726/6 |
| 2016/0094546 A1* | 3/2016 | Innes | G06F 21/33 713/156 |
| 2016/0359837 A1* | 12/2016 | Krstic | H04L 63/0807 |
| 2017/0093805 A1* | 3/2017 | Proulx | H04L 63/0876 |
| 2017/0195314 A1* | 7/2017 | Strand | H04L 63/0815 |
| 2018/0337914 A1* | 11/2018 | Mohamad Abdul | H04L 9/3213 |
| 2019/0074972 A1* | 3/2019 | Shastri | G06F 21/36 |
| 2019/0356649 A1* | 11/2019 | Alwen | H04L 9/0861 |

* cited by examiner

SYSTEM, METHOD, AND COMPUTER-READABLE RECORDING MEDIUM OF CREATING, ACCESSING, AND RECOVERING A USER ACCOUNT WITH SINGLE SIGN ON PASSWORD HIDDEN AUTHENTICATION

TECHNICAL FIELD

The subject matter of the present disclosure relates generally to creating, accessing, and recovering an account with a single sign on (SSO) password hidden authentication.

BACKGROUND

Mobile applications (APPs) typically require a user to create an account by providing a username and a password. This method of account creation and access requires the user to remember both the username and password every time the user logs in to the mobile application (APP). Therefore, issues occur when a user desires to log in, but forgets their password. The user may also write down their password, further weakening security of the APP and security access to the APP.

Thus, it would be advantageous and an improvement over the relevant technology to provide a system and/or a method that is capable of providing a password login and recovery mechanism that is hidden so that a user only needs to remember the username to log in to the APP.

SUMMARY

Embodiments described in the present disclosure provide methods to create, access, and recover user accounts with single sign on (SSO) password hidden authentication for components within a system that includes an electronic device (ED), a client device (CD), a cloud server (CS), and a cloud services platform (CSP). The methods include creating the user account by receiving an input of credential information via user input into the CD. The CD then automatically generates the SSO password. The SSO password is associated with the credential information. The SSO password is encrypted by the CD. The SSO password is stored in the CD and in the ED. The SSO password and encrypted SSO password are transmitted to the CSP by the CD. The SSO password and encrypted SSO password are then stored in the CSP and the SSO password is stored in the CS. This same SSO password can then be used for access to any other component within the system.

Once the user account is created, embodiments also include an accessing the user account through the CD having the SSO password stored therein. The CD receives the credential information via user input. The CD retrieves the SSO password associated with the credential information. The CD transmits the credential information and the retrieved SSO password to the CSP. The CSP receives the credential information and the retrieved SSO password and confirms a match between the credential information and the retrieved SSO password and the stored credential information and the SSO password during the creating of the user account.

If the SSO password is not accessible within a user device, the user device being one of at least one CD, when receiving the credential information, the user device requests a one time passcode from the CSP. The CSP transmits a one time passcode with the user device to a user email. The user device receives an entry of an entered passcode by the user. The user device sets a temporary password and sends the credential information, temporary password, and entered passcode to the CS. The CSP confirms a match between the sent passcode and the entered passcode. Once confirmed, the CSP resets the SSO password to the temporary password. The CS retrieves the encrypted SSO password and transmits to the user device. The user device retrieves an encryption key stored in the ED. The encrypted SSO password is decrypted using the encryption key. The temporary password is reset to the SSO password in the user device. The user device sends the SSO password to the CSP. The CSP receives the SSO password and resets the temporary password to the SSO password.

Embodiments described in the present disclosure provide a non-transitory computer-readable recording medium in one or more of the ED, the CS, and the CD for creating, accessing, and recovering accounts with SSO password hidden authentication for components within a system, each non-transitory computer-readable recording medium storing one or more programs which when executed by a respective processor performs a method comprising the creating, accessing, and recovering accounts as mentioned above.

Embodiments described in the present disclosure provide systems for creating, accessing, and recovering accounts with SSO password hidden authentication for components within a system. The systems include at least an ED, a CS, and at least one CD that includes an installed application (APP) stored within being configured to communicate and receive messages and transmit requests using a network connection. The at least one CD is configured to receive credential information via user input and then automatically generate the SSO password that is associated with the credential information. The at least one CD is configured to encrypt the SSO password. The ED and the at least one CD store the SSO password. The at least one CD is configured to transmit the SSO password and the encrypted SSO password to the CSP. The CSP is configured to store the SSO password and the encrypted SSO password. The CS is configured to store the SSO password.

When the at least one CD has the SSO password stored therein, the at least one CD is configured to receive the credential information via user input and to retrieve the SSO password associated with the credential information. The at least one CD is configured to transmit the credential information and the retrieved SSO password to the CSP. The CSP is configured to receive the credential information and the SSO password and confirming a match between the received credential information and the SSO password and the stored credential information and the SSO password during the creating of the user account. Additionally, the same SSO password is used for any other of these component within the system.

If the SSO password is unavailable in the at least one CD when receiving the credential information via user input, embodiments described in the present disclosure further provide that the at least one CD is configured to request a one time password from the CSP, and receive entry of the entered passcode by the user. The CSP is configured to transmit a one time passcode to a user email. The at least one CD is configured to set a temporary passcode and to send the credential information, the temporary passcode, and entered passcode to the CS. The CSP is configured to confirm a match between the sent passcode and the entered passcode, to reset the SSO password to the temporary password after a confirmation of a passcode match. The CS is configured to retrieve the encrypted SSO password from the CSP and to send the encrypted SSO password to the at least one CD. The at least one CD is configured to retrieve an encryption key stored in the ED, decrypt the encrypted SSO password using the encryption key, and to reset the temporary password to the SSO password. The at least one CD is configured to transmit the SSO password to the CSP. The CSP is configured to receive the SSO password from the at least one CD and to reset the temporary password to the SSO password received from the at least one CD, allowing access to the user account, when successfully reset.

BRIEF DESCRIPTION OF THE DRAWINGS

In the drawings, like reference numbers generally indicate identical, functionally similar, and/or structurally similar elements.

DETAILED DESCRIPTION

Figure 1:
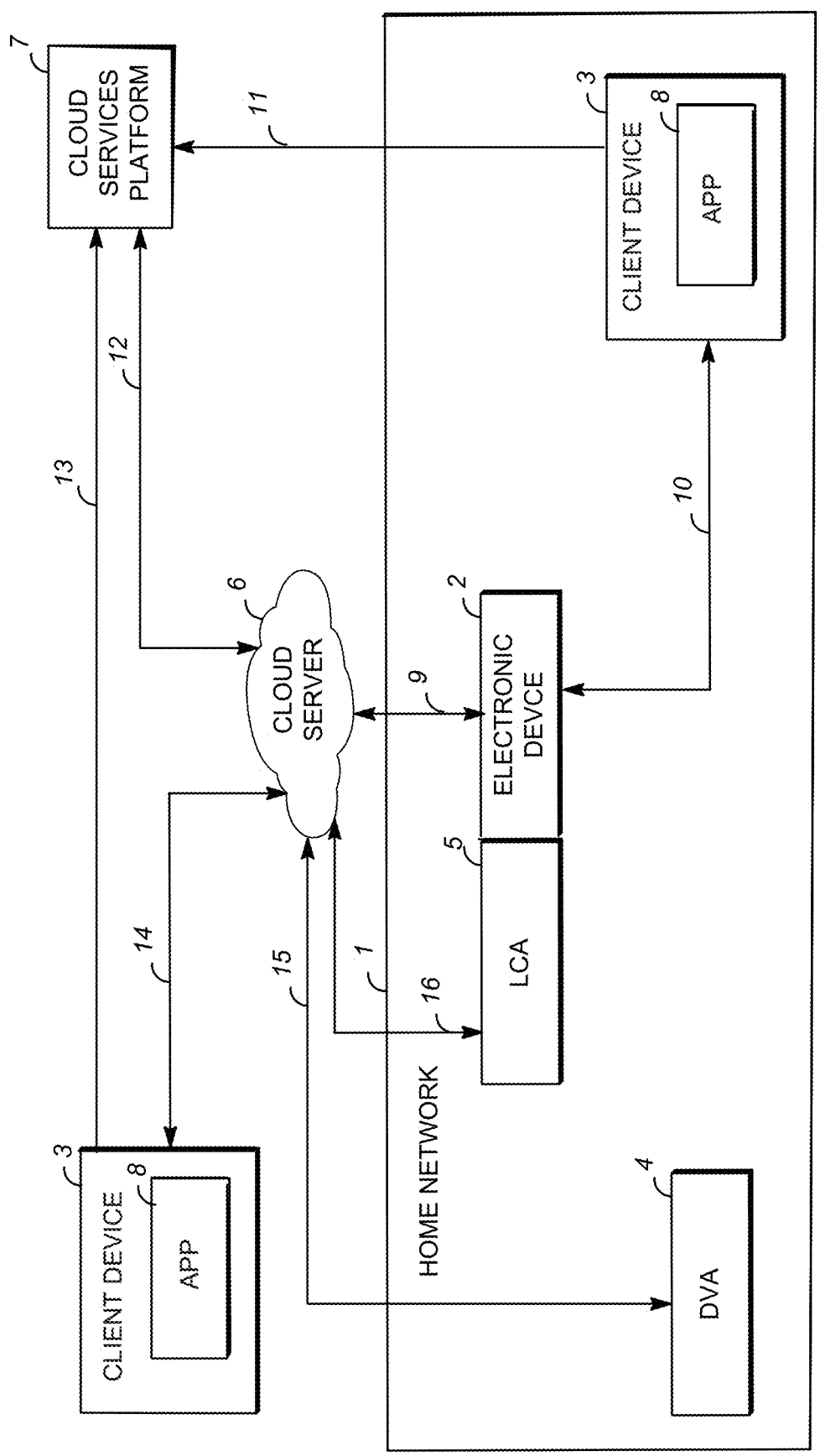
FIG. 1 is an illustration of a system that includes the management of user accounts across various system components according to the present disclosure.

FIG. 1 is an illustration of an embodiment of a system for creating, accessing, and recovering an account with a single sign on (SSO) password hidden authentication. As shown in FIG. 1, the system includes a home network (HN) 1 that includes at least an electronic device (ED) 2. The ED 2 can be a router. The system also includes at least one client device (CD) 3 that includes an application (APP) 8 installed on the CD 3. The CD 3 can be within the HN 1 or remotely outside of the HN 1 and still be part of the system. The system can include a digital voice assistant (DVA) 4 and local communication agent (LCA) 5 in the home network (HN) 1. The system further includes a cloud server (CS) 6 as part of a cloud services platform (CSP) 7. When referring to one specific CD or location within the following description below, only one of the particular component may be listed as an example of how all may operate. When describing how multiple of each component operates together, several of the components may be called out by number (i.e. #1, #2).

An explanation of exemplary internal components of the CDs 3, the DVA 4, the CSP 7, the ED 2, and the CS 6 shown in FIG. 1 will be provided in the discussion of FIGS. 5 through 9. However, in general, it is contemplated by the present disclosure that the CDs 3, the DVA 4, the LCA 5, the CSP 7, the ED 2, and the CS 6 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the CDs 3, the DVA 4, the LCA 5, the CSP 7, the ED 2, and the CS 6 may be adapted to execute any operating system, including Linux, UNIX, Windows Server, etc., as well as virtual machines adapted to virtualize execution of a particular operating system, including customized and proprietary operating systems, as well as virtual containers including Docker and LXC (Linux containers). The CDs 3, the DVA 4, the LCA 5, the CSP 7, the ED 2, and the CS 6 are further equipped with components to facilitate communication with other computing devices over one or more wireless network connections 9-16. The network connections 9-16 include connections to local and wide area networks, wireless networks, public and private networks, and any other communication network enabling communication in the system.

In FIG. 1, the ED 2 determines the area of the HN 1. Various components can be physically inside the area of the HN 1, while some components can move outside of or always be outside of the HN 1 physical space.

The CDs 3 can be a mobile device, personal computer, laptop, smartphone, tablet computer, personal digital assistant, in-vehicle computing systems, or other similar computing device. The CDs 3 include one or more memories or memory locations for storing the software components. The one or more memories in the CDs 3 include, but are not limited to, random access memory (RAM), dynamic random access memory (DRAM), read only memory (ROM), logic blocks of a field programmable gate array (FPGA), erasable programmable read only memory (EPROM), and electrically erasable programmable ROM (EEPROM).

The CDs 3 can include a user interface such as a key board, mouse, touchscreen display, network connection between user and ED 2, CSP 7, and CS 6, or other system components to allow a user to view and interact with the applications, tools, services, and other software of the CDs 3. The present disclosure contemplates that more than one CD 3 can be a part of the system as is shown in FIG. 1.

The CD 3 includes the APP 8. The APP 8 can be used to manage the features provided by the ED 2 inside or outside of the HN 1 through the CS 6. Access to a user account across various cloud system components can be run through the APP 8. It is helpful if the SSO password is synchronized across these various components for a seamless user experience.

Embodiments that include the DVA 4 as a cloud system component, have the DVA 4 located in the HN 1. Examples of DVAs 4 include, but are not limited to, Alexa, Echo, Google home, or the like. The DVA 4 can interact with the CS 6, and the CS 6 in turn can validate the DVA 4. Additionally, the LCA 5 is located in the HN 1. The APP 8 can communicate with the LCA 5 for using electronic device functionality such as parental control, home network status, or the like. The LCA 5 is a module of the ED 2. The LCA 5 can use peripherals of the ED 2 as a separate service within the ED 2. Therefore, details from the description of the ED 2 can be applied to the LCA 5.

The CS 6 connects to the ED 2 and other system components inside and outside of the HN 1. The CS 6 can include storage, user account management, user device management, notification, and user messaging. The CS 6 also interacts with the CSP 7 for user account related information authorization. The CSP 7 includes computer hardware, operating environment, and software infrastructure for cloud computing services. The CSP 7 communicates with the CS 6 and the APP 8 through the CD 3. The CSP 7 can provide credential services and user token management.

Sign on to the system is through credential information and a SSO password that is hidden from the user. The credential information can be a username or the like. As can be seen in the illustration of FIG. 1, network connections between the components transfer username and SSO password information along with other data. This communication allows for the creation, access, and recovery of the SSO password.

Figure 2:
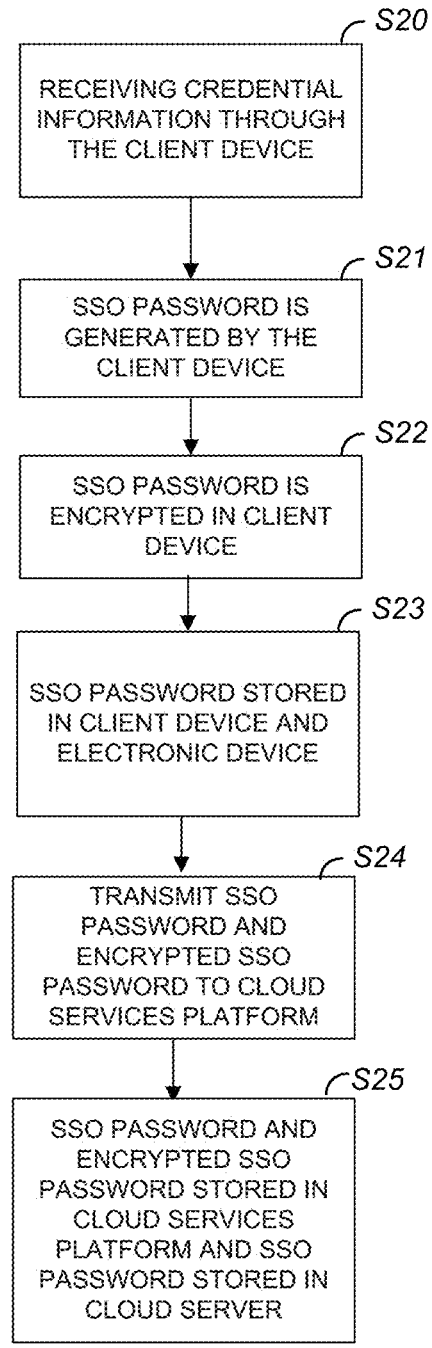
FIG. 2 illustrates a method for creating a user account with an SSO password hidden authentication using the system of FIG. 1 according to an embodiment of the present disclosure.

FIG. 2 illustrates a method for creating a hidden SSO password using the system of FIG. 1.

At least one CD 3 can be within range of the network connections 10, 11 within the HN 1. In step S20, a user creates a user account by entering credential information through the APP 8 stored in the at least one CD 3. The credential information includes at least a username that the user generates. Upon the receiving of the credential information, the at least one CD 3 will generate an SSO password in step S21. In step S22, the SSO password is encrypted. In step S23, the SSO password and the encrypted SSO password are stored by the CD 3 in a client device secure storage, and in the ED 2. The SSO password and the encrypted SSO password are then transmitted to the CS 6 in step S24. The SSO password and the encrypted SSO password are stored in the CS 6 in step S25. The same SSO password is used for any other component within the system, such as a DVA 4 or LCA 5 for example.

Figure 3:
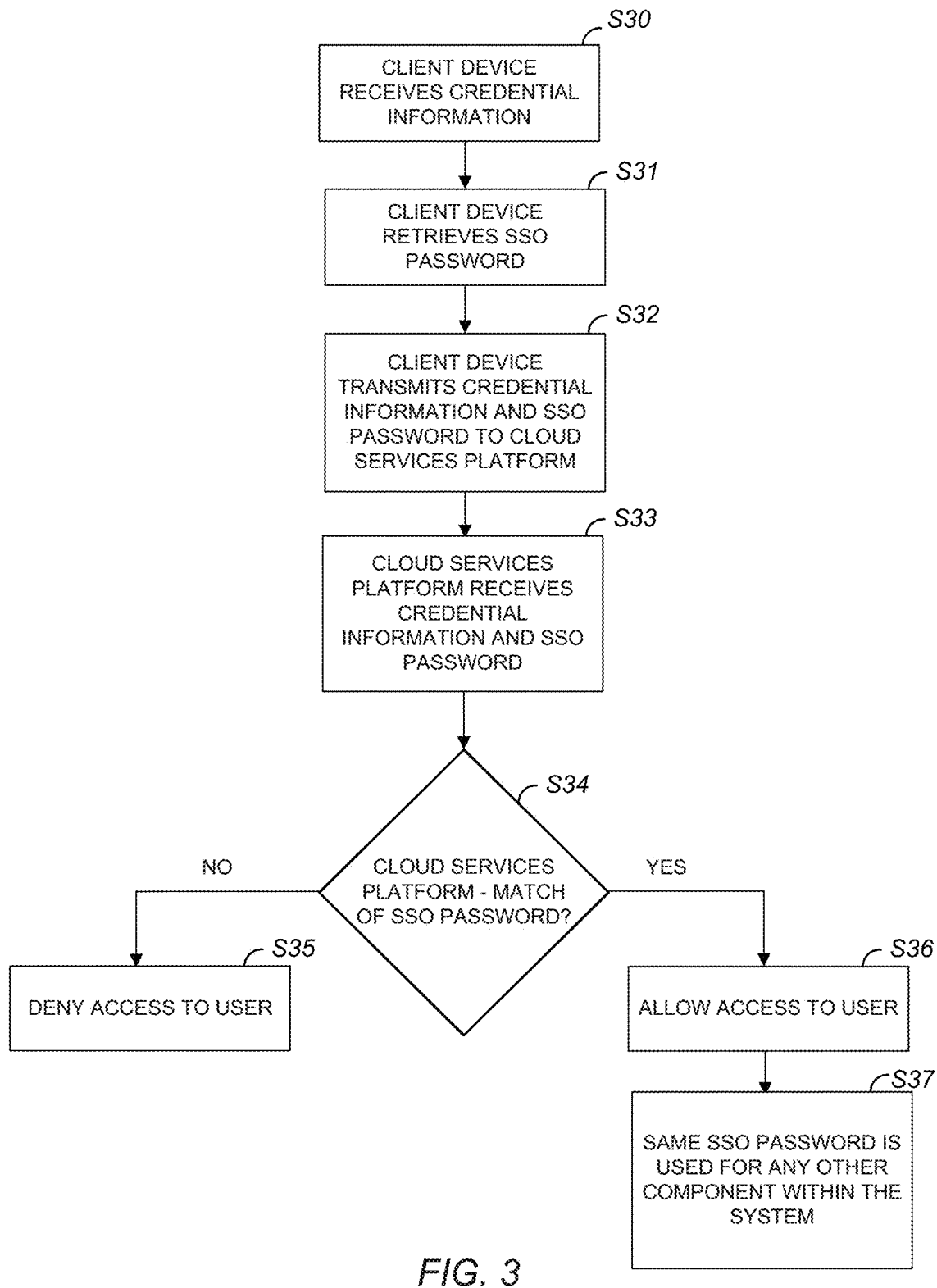
FIG. 3 illustrates a method for accessing a user account that has an SSO password hidden authentication using the system of FIG. 1 according to an embodiment of the present disclosure.

FIG. 3 illustrates a method for accessing a user account with an SSO password using the system of FIG. 1. The same SSO password is used to authorize the user for every subsequent application launch of the APP 8. When the at least one CD 3 has the SSO password stored therein, the at least one CD 3 receives credential information via user input in step S30. In step S31, the at least one CD 3 retrieves the SSO password associated with the credential information from within the at least one CD 3.

The at least one CD 3 then transmits the credential information and the retrieved SSO password to the CSP 7 in step S32. The CSP 7 receives the credential information and the retrieved SSO password in step S33. In step S34 the CSP 7 determines match between the received SSO password and credential information and the stored SSO password and credential information during the creating of the user account. If the match does not occur, the user is denied access in step S35. If, however, there is a match in the SSO password, the user is allowed access to the user account in step S36. Further, in step S37, the same SSO password can be used for other components within the system that includes the ED 2. The same SSO password that was generated through the at least one CD 3, can be linked to other components within the system as mentioned.

The system that includes the ED 2, can include several other cloud system components, such as the DVA 4, the LCA 5, the CS 6, and the CSP 7. All these components, and any other component that can be connected to the system, can be accessed through the SSO password generated through the at least one CD 3. The system has these components interconnected, so that all the components can be connected to the user through the username input and the generated SSO password. The synchronization of the SSO password across all components in the system allows for a seamless user experience from the APP 8. Additionally, the synchronized SSO password allows for security across the different components of the system.

Once the SSO password is in use and synchronized, every time the user launches the APP 8 on the at least one CD 3, an input of only the credential information is required by the user. With less to remember for the user, there is less to forget, and/or lose to another person. This limits security risks within the account access process. The system is able to access the SSO password when the at least one CD 3 is in the HN 1 and when the at least one CD 3 is remote from the HN 1 accessing the SSO password from the CS 6/CSP 7. There are situations, however, where the SSO password is unavailable to the APP 8, such as in the following. The SSO password is unavailable to the APP 8 in at least the following situations when 1) the APP 8 is being uninstalled or installed on a CD 3, 2) installing the APP 8 in a second CD 3, and 3) using the APP 8 in another CD 3 to access the user account. In this third scenario that is listed, an example may be a spouse, or other family member, of the initial user may want access to the user account through their own CD 3. These situations are a sample of cases where the SSO password may be unavailable to the APP 8.

Figure 4:
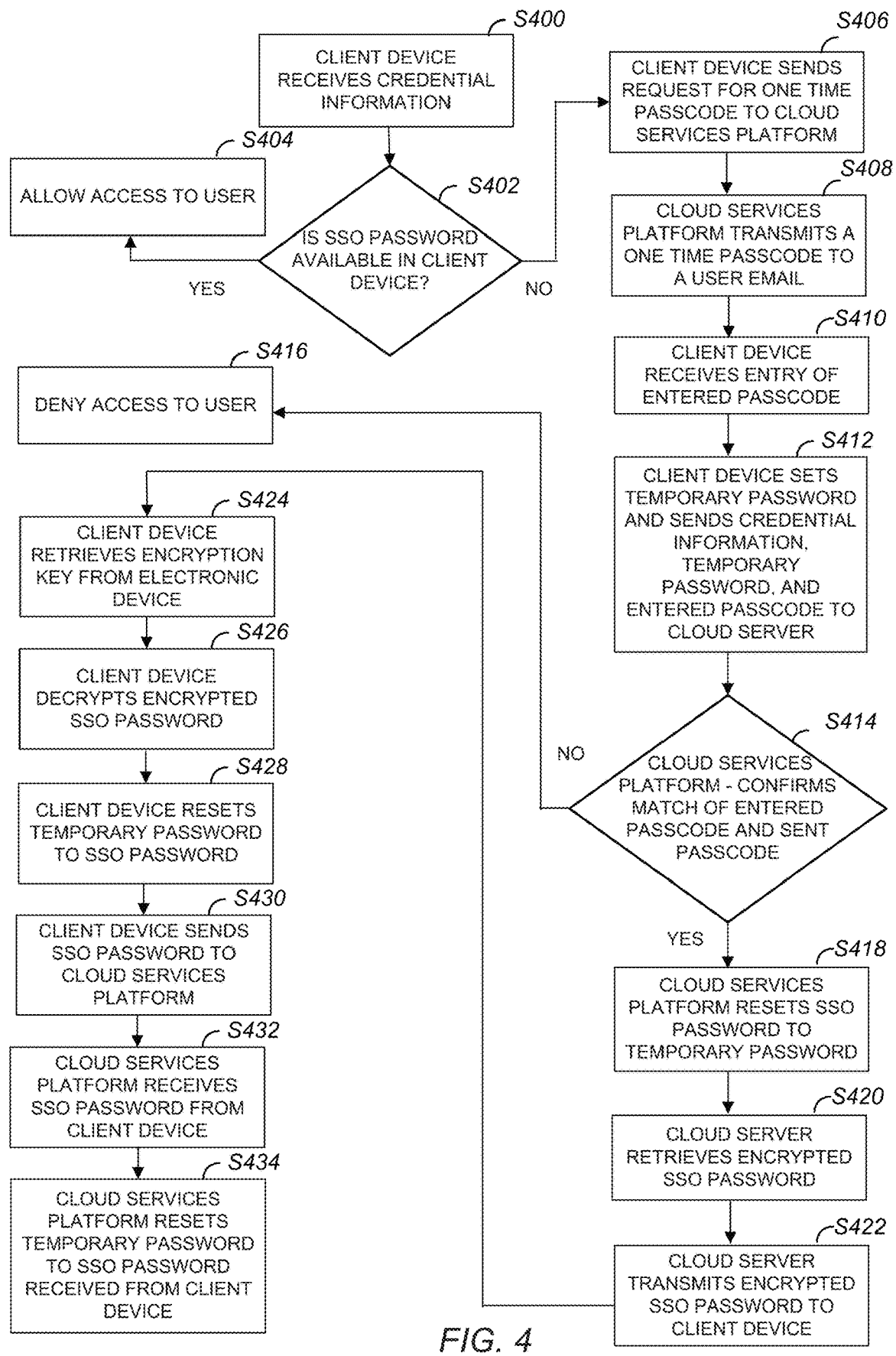
FIG. 4 illustrates a method for recovery of user account with an SSO password hidden authentication using the system of FIG. 1 according to an embodiment of the present disclosure.

FIG. 4 illustrates a method for the recovery of the SSO password hidden authentication using the system of FIG. 1.

Initially, when the user account is created, the APP 8 through the CD 3 stores an encrypted SSO password as mentioned above. The at least one CD 3 receives the credential information via user input in step S400. The at least one CD determines if the SSO password is available in step S402. If the SSO password is available, the user can be allowed access to the system in step S404 as described above using FIG. 3. The user then has access to all the components of the system including potentially, the DVA 4, the LCA 5, the CS 6, and the CSP 7 or other components. If the SSO password is unavailable, the at least one CD 3 sends a request for a one time passcode to the CSP 7 in step S406. The CSP 7 transmits the one time passcode to a user email in step S408. In step S410, the at least one CD 3 receives entry of an entered passcode by the user. The CD 3 then sets a temporary password and sends the credential information, the temporary password, and the entered passcode to the CS 6 in step S412. The CSP 7 confirms if there is a match between entered passcode and sent passcode in step S414. If there is no match, the at least one CSP 7 stops process and denies access in step S416. If there is a match, the CSP 7 resets the SSO password to the temporary password in step S418. In step S420, the CS 6 retrieves the encrypted SSO password and then transmits the encrypted SSO password to the at least one CD 3 in step S422. The at least one CD 3 retrieves the encryption key from the ED 2 in step S424. The at least one CD 3 then decrypts the encrypted SSO password in step S426. In step S428, the at least one CD 3 resets the temporary password to the SSO password. The at least one CD 3 sends the SSO password to the CSP 7 in step S430. The CSP 7 receives the SSO password from the at least one CD 3 in step S432. In step S434, the CSP 7 resets the temporary password to the SSO password received from the at least one CD 3. At this point, the user can then access the user account similar to the process illustrated in FIG. 3.

Just resetting the user account SSO password to a temporary password is not helpful when other components are using the SSO password generated during the creation of the user account. Resetting the user account temporary password to the SSO password alleviates this issue by returning to the SSO password that is used by other components within the system. Retrieving the encrypted SSO password and the electronic device specific key, allows the at least one CD 3 to reset the temporary password of the user account back to the SSO password.

An example of the HN 1 where this method may be processed, is within an environment of a home setting, office setting, or the like. Some homes have tens of CDs 3 with multiple CDs 3 for each family member or guest that visits the house.

Figure 5:
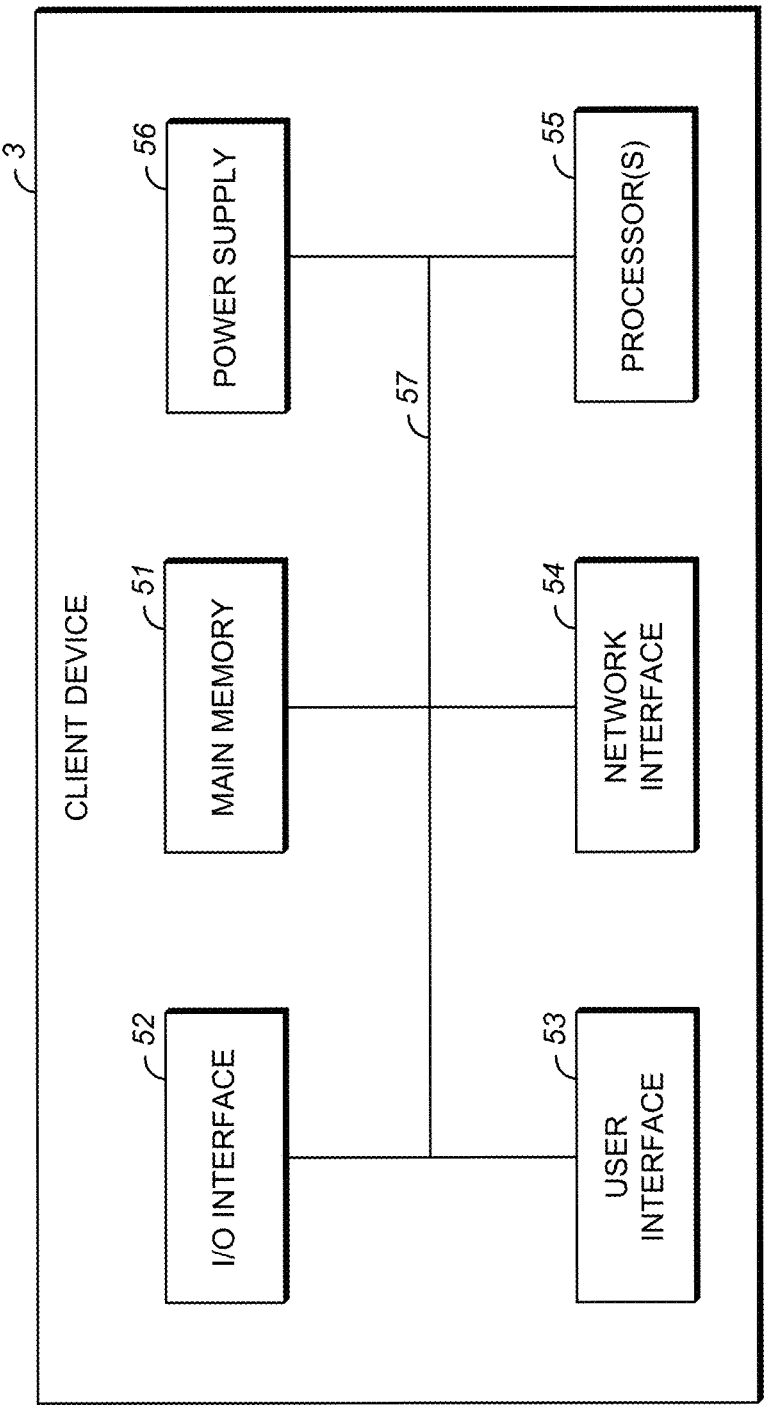
FIG. 5 is a schematic diagram of an exemplary client device according to an embodiment of the present disclosure.

FIG. 5 is a schematic diagram of an exemplary CD 3 according to an embodiment of the present disclosure. It is contemplated by the present disclosure that the CD 3 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 5, the exemplary CD 3 includes one or more memories or memory locations including a main memory 51 as well as an I/O interface 52, a user interface 53, a network interface 54, one or more processors 55, and an optional power supply 45. The main memory 51 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 51 can be used to store any type of instructions associated with algorithms, processes, or operations for controlling the general functions of the CD 3 including the operations of software, such as the APP 8, as well as any operating system such as Linux, UNIX, Windows Server, or other customized and proprietary operating systems.

The optional power supply 56 can be used to power the various components of the CD 3. The power supply 56 can be self-contained, such as a battery pack, and/or the power supply 56 can include an interface to be powered through an electrical outlet.

The I/O interface 52 can be an interface for enabling the transfer of information between CD 3 and external devices connected to the CD 3 that need special communication links for interfacing with the one or more processors 55. The I/O interface 52 can be implemented to accommodate various connections to the CD 3 that include, but are not limited to, a universal serial bus (USB) connection, parallel connection, a serial connection, coaxial connection, a High-Definition Multimedia Interface (HDMI) connection, or other known connection in the art connecting to external devices.

The user interface 53 is implemented for allowing communication between a user and the CD 3. The user interface 53 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 54 is a software and/or hardware interface implemented to establish a connection between the CD 3 and Internet connection in the system described in FIG. 1. It is contemplated by the present disclosure that the network interface 54 includes software and/or hardware interface circuitry for establishing communication connections with the rest of the system using both wired and wireless connections for establishing connections to, for example, local area networks (LANs), wide area networks (WANs), metropolitan area networks (MANs), personal area networks (PANs), wireless local area networks (WLANs), system area networks (SANs), and other similar networks.

The one or more processors 55 are used for controlling the general operations of the CD 3. Each one or the one or more processors 55 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the CD 3. Communication between the components of the CD 3 (e.g., 51-56) are established using an internal bus 57.

Figure 6:
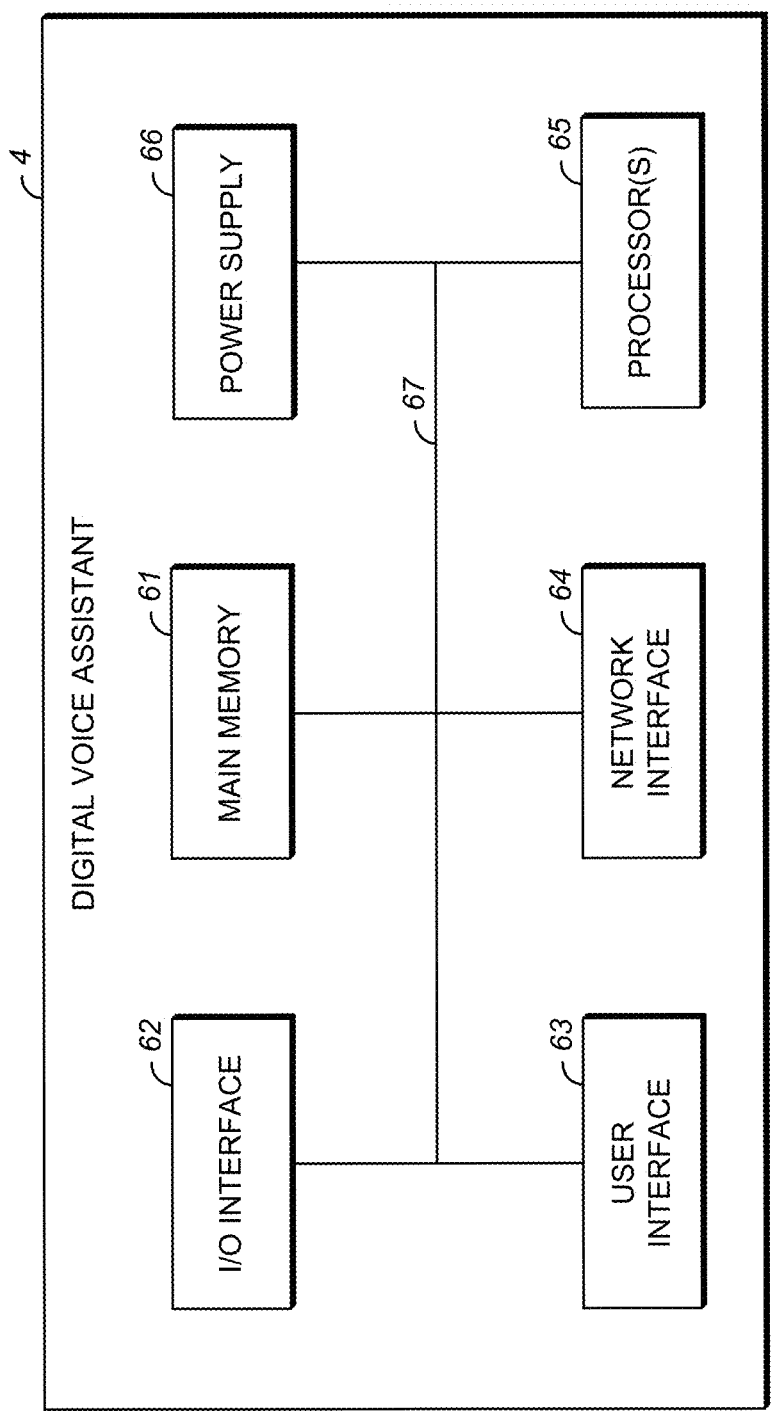
FIG. 6 is a schematic diagram of an exemplary digital voice assistant according to an embodiment of the present disclosure.

FIG. 6 is a schematic diagram of an exemplary digital voice assistant (DVA) 4 according to an embodiment of the present disclosure. It is contemplated by the present disclosure that the DVA 4 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 6, the exemplary DVA 4 includes one or more memories or memory locations including a main memory 61 as well as an I/O interface 62, a user interface 63, a network interface 64, one or more processors 65, and an optional power supply 66. The main memory 61 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 61 can be used to store any type of instructions associated with algorithms, processes, or operations for controlling the general functions of the DVA 4 including the operations of software as well as any operating system such as Linux, UNIX, Windows Server, or other customized and proprietary operating systems.

The optional power supply 66 can be used to power the various components of the DVA 4. The power supply 66 can be self-contained, such as a battery pack, and/or the power supply 66 can include an interface to be powered through an electrical outlet.

The I/O interface 62 can be an interface for enabling the transfer of information between DVA 4 and external devices connected to the DVA 4 that need special communication links for interfacing with the one or more processors 65. The I/O interface 62 can be implemented to accommodate various connections to the DVA 4 that include, but is not limited to, a universal serial bus (USB) connection, parallel connection, a serial connection, coaxial connection, a High- Definition Multimedia Interface (HDMI) connection, or other known connection in the art connecting to external devices.

The user interface 63 is implemented for allowing communication between a user and the DVA 4. The user interface 63 includes, but is not limited to, a mouse, a keyboard, a liquid crystal display (LCD), cathode ray tube (CRT), thin film transistor (TFT), light-emitting diode (LED), high definition (HD), or other similar display device with touch screen capabilities. The network interface 64 is a software and/or hardware interface implemented to establish a connection between the DVA 4 and the ED 2 in the system described in FIG. 1. It is contemplated by the present disclosure that the network interface 56 includes software and/or hardware interface circuitry for establishing communication connections with the rest of the system using both wired and wireless connections for establishing connections to, for example, a local area networks (LANs), wide area networks (WANs), metropolitan area networks (MANs), personal area networks (PANs), wireless local area networks (WLANs), system area networks (SANs), and other similar networks.

The one or more processors 65 are used for controlling the general operations of the DVA 4. Each one or the one or more processors 65 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the DVA 4. Communication between the components of the DVA 4 (e.g., 61-66) are established using an internal bus 67.

Figure 7:
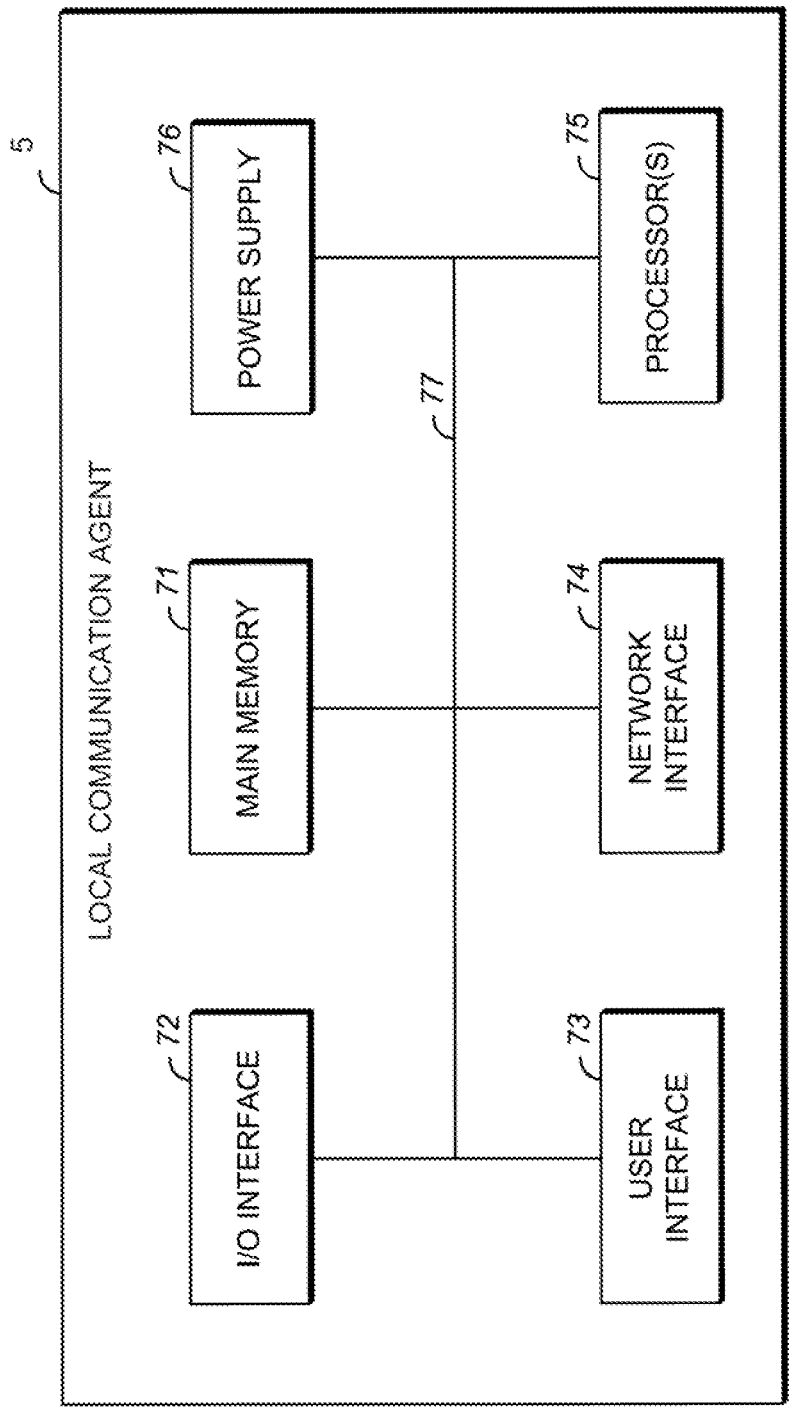
FIG. 7 is a schematic diagram of an exemplary local communication agent according to an embodiment of the present disclosure.

FIG. 7 is a schematic diagram of an exemplary local communication agent (LCA) 5 according to an embodiment of the present disclosure. It is contemplated by the present disclosure that the LCA 5 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 7, the exemplary LCA 5 includes one or more memories or memory locations including a main memory 71 as well as an I/O interface 72, a user interface 73, a network interface 74, one or more processors 75, and an optional power supply 76. The main memory 71 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 71 can be used to store any type of instructions associated with algorithms, processes, or operations for controlling the general functions of the LCA 5 including the operations of software as well as any operating system such as Linux, UNIX, Windows Server, or other customized and proprietary operating systems.

The optional power supply 76 can be used to power the various components of the LCA 5. The power supply 76 can be self-contained, such as a battery pack, and/or the power supply 76 can include an interface to be powered through an electrical outlet.

The I/O interface 72 can be an interface for enabling the transfer of information between LCA 5 and external devices connected to the LCA 5 that need special communication links for interfacing with the one or more processors 75. The I/O interface 72 can be implemented to accommodate various connections to the LCA 5 that include, but is not limited to, a universal serial bus (USB) connection, parallel connection, a serial connection, coaxial connection, a High-Definition Multimedia Interface (HDMI) connection, or other known connection in the art connecting to external devices.

The user interface 73 is implemented for allowing communication between a user and the LCA 5. The user interface 73 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 74 is a software and/or hardware interface implemented to establish a connection between the LCA 5 and the ED 2 in the system described in FIG. 1. It is contemplated by the present disclosure that the network interface 74 includes software and/or hardware interface circuitry for establishing communication connections with the rest of the system using both wired and wireless connections for establishing connections to, for example, a local area networks (LANs), wide area networks (WANs), metropolitan area networks (MANs) personal area networks (PANs), and wireless local area networks (WLANs), system area networks (SANs), and other similar networks.

The one or more processors 75 are used for controlling the general operations of the LCA 5. Each one or the one or more processors 75 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the LCA 5. Communication between the components of the LCA 5 (e.g., 71-76) are established using an internal bus 77.

Figure 8:
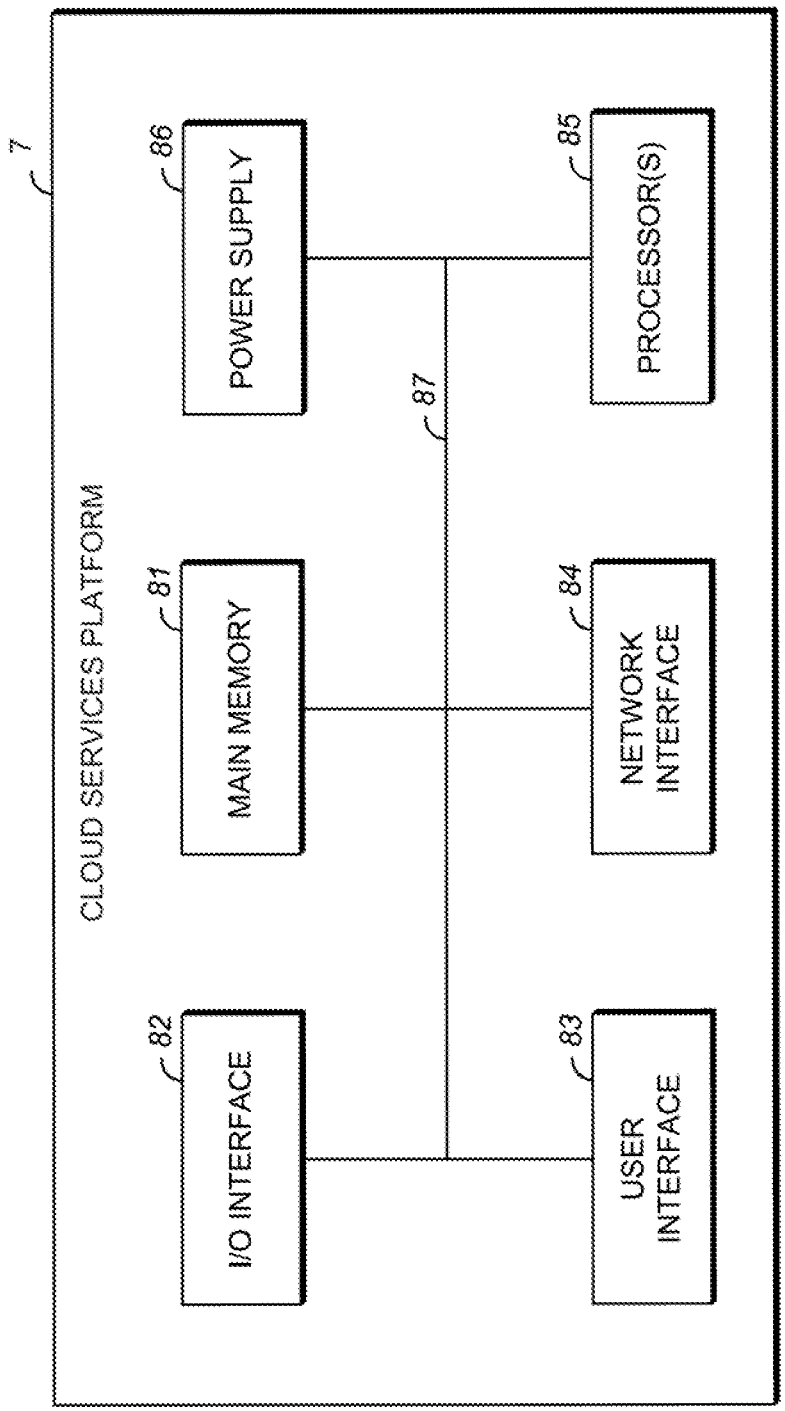
FIG. 8 is a schematic diagram of an exemplary cloud services platform according to an embodiment of the present disclosure.

FIG. 8 is a schematic diagram of an exemplary cloud services platform (CSP) 7 according to an embodiment of the present disclosure. It is contemplated by the present disclosure that the CSP 7 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 8, the exemplary CSP 7 includes one or more memories or memory locations including a main memory 81 as well as an I/O interface 82, a user interface 83, a network interface 84, one or more processors 85, and an optional power supply 86. The main memory 81 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 81 can be used to store any type of instructions associated with algorithms, processes, or operations for controlling the general functions of the CSP 7 including the operations of software as well as any operating system such as Linux, UNIX, Windows Server, or other customized and proprietary operating systems.

The optional power supply 86 can be used to power the various components of the CSP 7. The power supply 86 can be self-contained, such as a battery pack, and/or the power supply 86 can include an interface to be powered through an electrical outlet.

The I/O interface 82 can be an interface for enabling the transfer of information between CSP 7 and external devices connected to the CSP 7 that need special communication links for interfacing with the one or more processors 75. The I/O interface 82 can be implemented to accommodate various connections to the CSP 7 that include, but is not limited to, a universal serial bus (USB) connection, parallel connection, a serial connection, coaxial connection, a High-Definition Multimedia Interface (HDMI) connection, or other known connection in the art connecting to external devices.

The user interface 83 is implemented for allowing communication between a user and the CSP 7. The user interface 83 includes, but is not limited to, a mouse, a keyboard, a liquid crystal display (LCD), cathode ray tube (CRT), thin film transistor (TFT), light-emitting diode (LED), high definition (HD), or other similar display device with touch screen capabilities. The network interface 84 is a software and/or hardware interface implemented to establish a connection between the CSP 7 and the ED 2 in the system described in FIG. 1. It is contemplated by the present disclosure that the network interface 84 includes software and/or hardware interface circuitry for establishing communication connections with the rest of the system using both wired and wireless connections for establishing connections to, for example, a local area networks (LANs), wide area networks (WANs), metropolitan area networks (MANs), personal area networks (PANs), wireless local area networks (WLANs), system area networks (SANs), and other similar networks.

The one or more processors 85 are used for controlling the general operations of the CSP 7. Each one or the one or more processors 85 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the CSP 7. Communication between the components of the CSP 7 (e.g., 81-86) are established using an internal bus 87.

Figure 9:
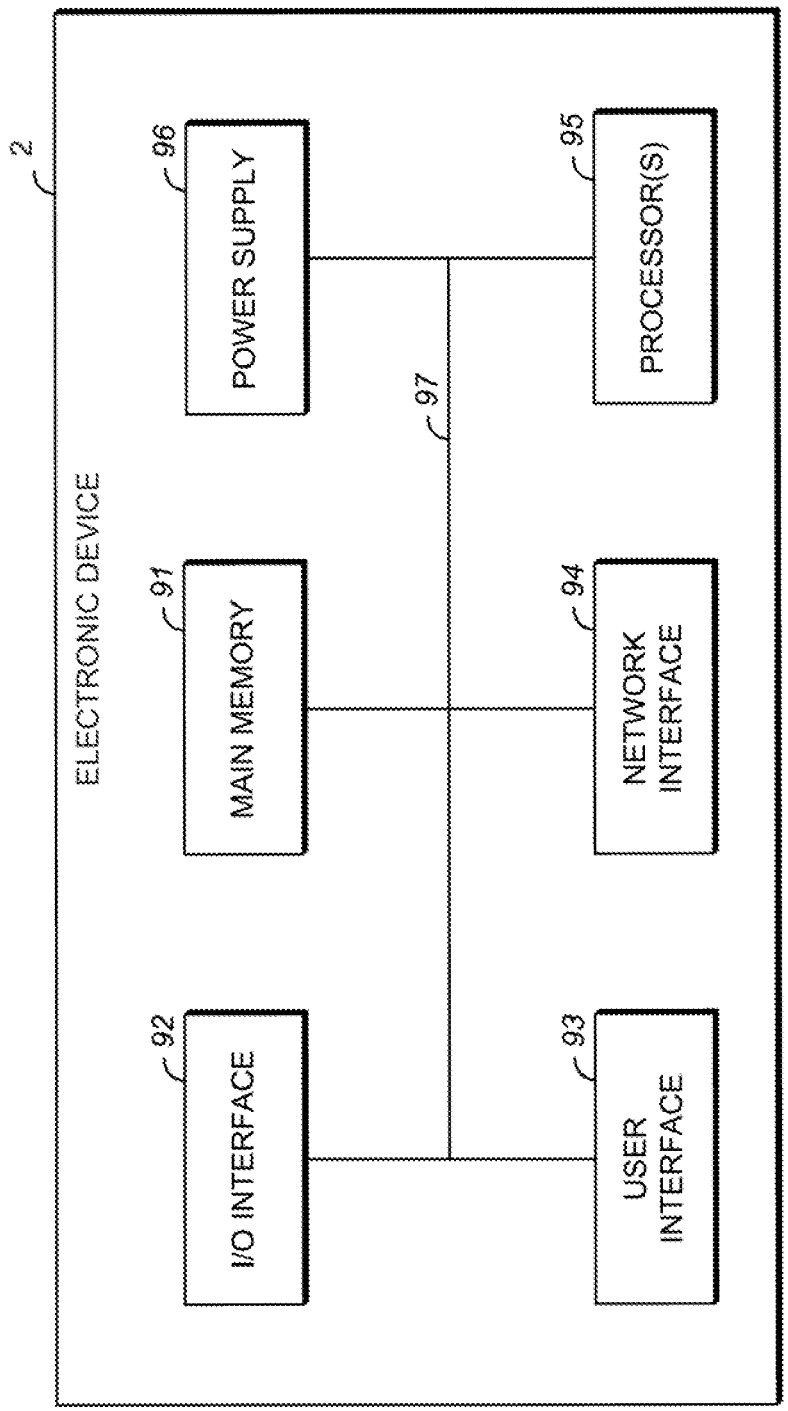
FIG. 9 is a schematic diagram of an exemplary electronic device according to an embodiment of the present disclosure.

FIG. 9 is a schematic diagram of an exemplary ED 2 according to an embodiment of the present disclosure. It is contemplated by the present disclosure that the ED 2 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 9, the exemplary ED 2 includes one or more memories or memory locations including a main memory 91 as well as an I/O interface 92, a user interface 93, a network interface 94, and one or more processors 95. The main memory 91 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 91 can be used to store any type of instructions associated with algorithms, processes, or operations for controlling the general functions of the ED 2 including the operations of software as well as any operating system such as Linux, UNIX, Windows Server, or other customized and proprietary operating systems.

The optional power supply 96 can be used to power the various components of the ED 2. The power supply 96 can be self-contained, such as a battery pack, and/or the power supply 96 can include an interface to be powered through an electrical outlet.

The I/O interface 92 can be an interface for enabling the transfer of information between ED 2 and external devices connected to the ED 2 that need special communication links for interfacing with the one or more processors 95. The I/O interface 92 can be implemented to accommodate various connections to the ED 2 that include, but is not limited to, a universal serial bus (USB) connection, parallel connection, a serial connection, coaxial connection, a High-Definition Multimedia Interface (HDMI) connection, or other known connection in the art connecting to external devices.

The user interface 93 is implemented for allowing communication between a user and the ED 2. The user interface 93 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 94 is a software and/or hardware interface implemented to establish a connection between the ED 2 and the CS 6 in the system described in FIG. 1. It is contemplated by the present disclosure that the network interface 94 includes software and/or hardware interface circuitry for establishing communication connections with the rest of the system using both wired and wireless connections for establishing connections to, for example, a local area networks (LANs), wide area networks (WANs), metropolitan area networks (MANs), personal area networks (PANs), wireless local area networks (WLANs), system area networks (SANs), and other similar networks.

The one or more processors 95 are used for controlling the general operations of the ED 2. Each one or the one or more processors 95 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the ED 2. Communication between the components of the ED 2 (e.g., 91-96) are established using an internal bus 97.

Figure 10:
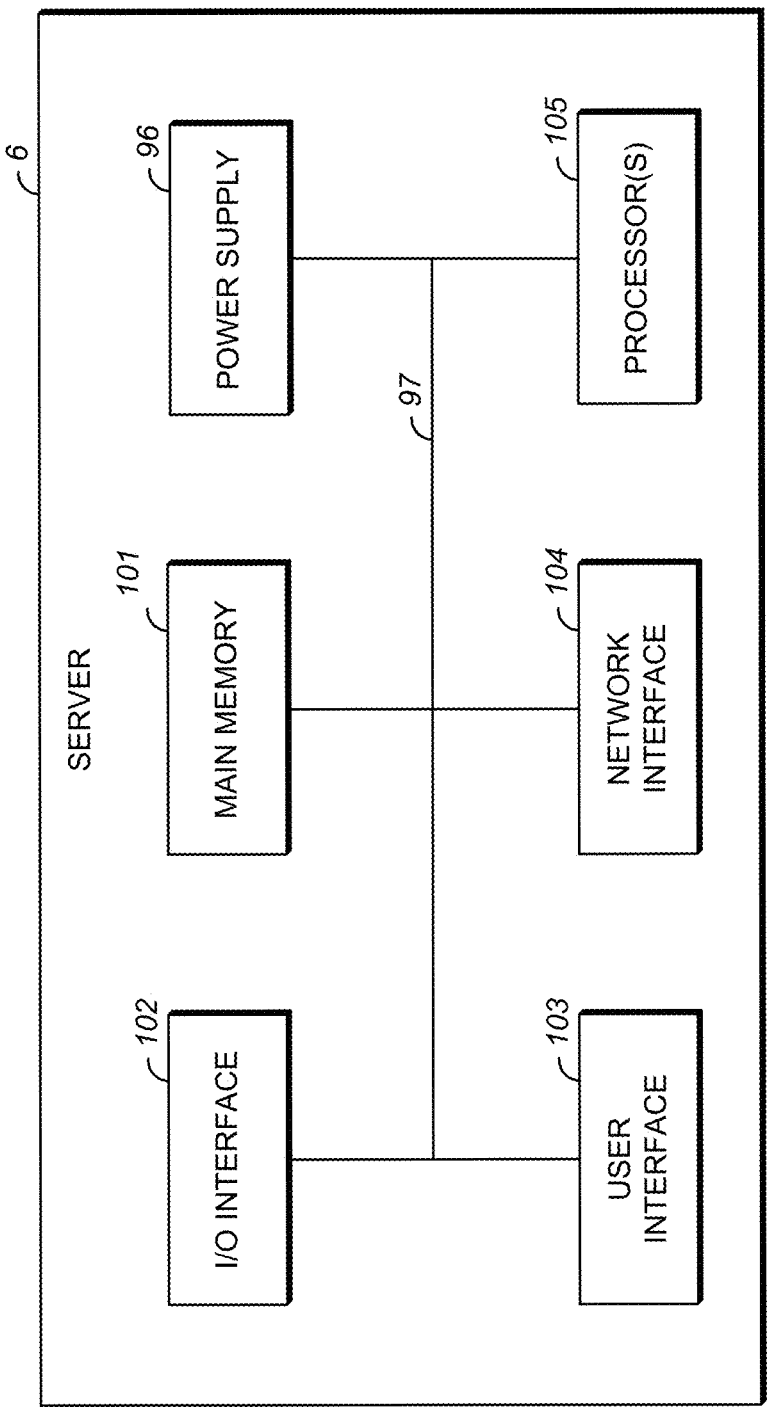
FIG. 10 is a schematic diagram of an exemplary server according to an embodiment of the present disclosure.

FIG. 10 is a schematic diagram of an exemplary server 6 according to an embodiment of the present disclosure. It is contemplated by the present disclosure that the cloud server (CS) 6 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 10, the exemplary CS 6 includes one or more memories or memory locations including a main memory 101 as well as an I/O interface 102, a user interface 103, a network interface 104, one or more processors 105, and an optional power supply 106. The main memory 101 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 101 can be used to store any type of instructions associated with algorithms, processes, or operations for controlling the general functions of the CS 6 including the operations of software as well as any operating system such as Linux, UNIX, Windows Server, or other customized and proprietary operating systems.

The optional power supply 106 can be used to power the various components of the CS 6. The power supply 106 can be self-contained, such as a battery pack, and/or the power supply 106 can include an interface to be powered through an electrical outlet.

The I/O interface 102 can be an interface for enabling the transfer of information between CS 6 and external devices connected to the CS 6 that need special communication links for interfacing with the one or more processors 105. The I/O interface 102 can be implemented to accommodate various connections to the CS 6 that include, but is not limited to, a universal serial bus (USB) connection, parallel connection, a serial connection, coaxial connection, a High-Definition Multimedia Interface (HDMI) connection, or other known connection in the art connecting to external devices.

The user interface 103 is implemented for allowing communication between a user and the CS 6. The user interface 103 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 104 is a software and/or hardware interface implemented to establish a connection between the CS 6 and the ED 2 in the system described in FIG. 1. It is contemplated by the present disclosure that the network interface 104 includes software and/or hardware interface circuitry for establishing communication connections with the rest of the system using both wired and wireless connections for establishing connections to, for example, a local area networks (LANs), wide area networks (WANs), metropolitan area networks (MANs), personal area networks (PANs), wireless local area networks (WLANs), system area networks (SANs), and other similar networks.

The one or more processors 105 are used for controlling the general operations of the CS 6. Each one or the one or more processors 105 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the CS 6. Communication between the components of the CS 6 (e.g., 101-106) are established using an internal bus 107.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components which perform a part or all of the functions of the secure conditional access architecture.

The present disclosure includes the use of computer programs or algorithms. The programs or algorithms can be stored on a non-transitory computer-readable medium for causing a computer, such as the one or more processors, to execute the steps described in FIGS. 1-4. For example, the one or more memories stores software or algorithms with executable instructions and the one or more processors can execute a set of instructions of the software or algorithms in association with executing generating, processing provisioning requests and provisioning messages, as described in FIGS. 1-4.

The computer programs, which can also be referred to as programs, software, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner.

The subject matter of the present disclosure is provided as examples of systems, methods, and programs for performing the features of the secure conditional access architecture. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method of a client device for creating and accessing a user account of a user with a single sign on (SSO) password, the method comprising:
creating the user account by:
receiving credential information via a user input;
automatically generating the SSO password, wherein the SSO password is associated with the credential information;
encrypting the SSO password using an encryption key retrieved, by the client device, from an electronic device within a network;
storing the SSO password in the client device and the electronic device; and
transmitting the SSO password and the encrypted SSO password to a cloud services platform for storage at the cloud services platform, wherein the cloud services platform is outside the network; and
after creating the user account:
determining that the SSO password is not available to an application of the client device;
receiving the credential information via user input into the user device;
requesting a one time passcode from the cloud services platform to be sent to a user email of the user;
receiving entry of an entered passcode by the user;
setting a temporary password;
sending the credential information, the temporary password, and the entered passcode to the cloud server;
receiving an encrypted SSO password from the cloud server based on the entered passcode and the one time passcode;
retrieving the encryption key from the electronic device;
decrypting the encrypted SSO password using the encryption key as the SSO password;
resetting the temporary password to the SSO password; and
transmitting the SSO password to the cloud services platform.

2. The method according to claim 1, further comprising:
accessing the user account having the SSO password stored therein by:
receiving the credential information via an another user input;
retrieving the SSO password associated with the credential information;
transmitting the credential information and the retrieved SSO password to the cloud services platform; and
being allowed access to the user account based on the received SSO password and the SSO password which was stored in the cloud services platform during the creating of the user account.

3. The method according to claim 1, wherein the user credentials include a username of the user.

4. The method according to claim 1, wherein the client device is part of a system that comprises the electronic device of a home network.

5. The method according to claim 4, wherein the user account provides access to a digital voice assistant within the home network within the system.

6. The method according to claim 4, wherein the user account provides access to a local communication agent within the home network.

7. The method according to claim 1, wherein the SSO password is used to manage multiple components within the system.

8. The method according to claim 4, wherein the system comprises a second client device, and wherein the second client device has the same SSO password to access components within the system based off of user account related information.

9. A non-transitory computer-readable recording medium in a client device for creating and accessing a user account of a user with a single sign on (SSO) password, the non-transitory computer-readable recording medium storing one or more programs which when executed by a processor of the client device causes the client device to perform one or more operations comprising:
creating the user account by:
receiving credential information via a user input;
automatically generating the SSO password, wherein the SSO password is associated with the credential information;
encrypting the SSO password using an encryption key retrieved, by the client device, from an electronic device within a network;
storing the SSO password in the client device and the electronic device; and
transmitting the SSO password and the encrypted SSO password to a cloud services platform for storage at the cloud services platform, wherein the cloud services platform is outside the network; and
determining that the SSO password is not available to an application of the client device;
requesting a one time passcode from the cloud services platform to be sent to a user email of the user;
receiving entry of an entered passcode by the user;
setting a temporary password;
sending the credential information, the temporary password, and the entered passcode to the cloud server;
receiving an encrypted SSO password from the cloud server based on the entered passcode and the one time passcode;
retrieving the encryption key from the electronic device;
decrypting the encrypted SSO password using the encryption key as the SSO password;
resetting the temporary password to the SSO password; and
transmitting the SSO password to the cloud services platform.

10. The non-transitory computer-readable recording medium of claim 9, the one or more programs when executed by the processor further cause the client device to perform one or more further operations comprising: of the one client,
accessing the user account having the SSO password stored therein by:
receiving the credential information via another user input;
retrieving the SSO password associated with the credential information;

transmitting the credential information and the retrieved SSO password to the cloud services platform; and being allowed access to the user account based on the received SSO password and the SSO password which was stored in the cloud services platform during the creating of the user account.

11. A client device for creating and accessing a user account of a user with single sign on (SSO) password, the client device comprising:
a memory storing one or more instructions;
a processor configured to execute the one or more instructions to:
create the user account by:
receiving credential information via a user input;
automatically generating the SSO password, wherein the SSO password is associated with the credential information;
encrypting the SSO password using an encryption key retrieved, by the client device, from an electronic device within a network; and
transmitting the encrypted SSO password and the SSO password to a cloud services platform; and
after creating the user account:
determine that the SSO password is not available to an application of the client device;
receive the credential information via user input;
request a one time passcode from the cloud services platform;
receive entry of an entered passcode by the user;
set a temporary password;
send the credential information, temporary password, and the entered passcode to the cloud server;
receiving an encrypted SSO password from the cloud server based on the entered passcode and the one time passcode;
retrieve the encryption key from the electronic device;
decrypt the encrypted SSO password using the encryption key;
reset the temporary password to the SSO password; and
transmit the SSO password to the cloud services platform, wherein the cloud services platform is outside the network.

12. The client device according to claim 11, wherein the processor is further configured to execute the one or more instructions to:
receive credential information via an another user input and to retrieve the stored SSO password associated with the credential information;
transmit the credential information and the retrieved SSO password to the cloud server; and
be allowed access to the user account based on the received SSO password and credential information which was stored in the cloud server during the creating of the user account.

13. The system according to claim 11, wherein the user credentials include a username of the user.

14. The system according to claim 11, wherein the client device is part of a system that comprises the electronic device of a home network.

15. The system according to claim 14, wherein the user account provides access to a digital voice assistant within the home network.

16. The system according to claim 14, wherein the user account provides access to a local communication agent within the home network.

* * * * *